United States Patent
Togashi et al.

(10) Patent No.: US 11,434,604 B2
(45) Date of Patent: Sep. 6, 2022

(54) COLORED FIBER FABRIC AND METHOD FOR PRODUCING COLORED FIBER FABRIC

(71) Applicant: KOMATSU MATERE CO., LTD., Ishikawa (JP)

(72) Inventors: Kohsuke Togashi, Ishikawa (JP); Konosuke Uozumi, Ishikawa (JP); Osamu Hanida, Ishikawa (JP); Itsuro Yamazaki, Ishikawa (JP)

(73) Assignee: KOMATSU MATERE CO., LTD., Ishikawa (JP)

( * ) Notice: Subject to any disclaimer, the term of this patent is extended or adjusted under 35 U.S.C. 154(b) by 864 days.

(21) Appl. No.: 15/754,833

(22) PCT Filed: Sep. 7, 2016

(86) PCT No.: PCT/JP2016/076252
§ 371 (c)(1),
(2) Date: Feb. 23, 2018

(87) PCT Pub. No.: WO2017/047461
PCT Pub. Date: Mar. 23, 2017

(65) Prior Publication Data
US 2020/0224364 A1 Jul. 16, 2020

(30) Foreign Application Priority Data
Sep. 16, 2015 (JP) .............................. JP2015-183195

(51) Int. Cl.
*D06P 1/44* (2006.01)
*B32B 27/20* (2006.01)

(52) U.S. Cl.
CPC ................ *D06P 1/44* (2013.01); *B32B 27/20* (2013.01)

(58) Field of Classification Search
None
See application file for complete search history.

(56) References Cited

U.S. PATENT DOCUMENTS

| | | | |
|---|---|---|---|
| 4,562,107 A | 12/1985 | Daniels | |
| 5,733,855 A * | 3/1998 | Severns | C11D 1/74 510/295 |
| 6,451,070 B1 * | 9/2002 | Kent | D06P 1/44 8/442 |
| 2007/0126831 A1 * | 6/2007 | Suzuki | D06P 5/30 347/100 |
| 2010/0035500 A1 * | 2/2010 | Kimura | D04H 1/4382 442/353 |
| 2011/0102497 A1 * | 5/2011 | Sato | D06P 5/30 347/21 |
| 2013/0086753 A1 * | 4/2013 | Kramer | D06M 10/06 8/115.6 |
| 2013/0209743 A1 * | 8/2013 | Deguchi | D04B 1/16 428/156 |
| 2013/0261209 A1 | 10/2013 | Kim et al. | |
| 2014/0303292 A1 | 10/2014 | Hayashi et al. | |
| 2015/0044372 A1 * | 2/2015 | Okada | D06P 1/44 427/265 |
| 2016/0096348 A1 * | 4/2016 | Maruyama | B32B 5/24 442/286 |
| 2016/0242475 A1 * | 8/2016 | Uozumi | A41D 13/01 |
| 2017/0233595 A1 * | 8/2017 | Erdodi | C09D 11/037 428/201 |

FOREIGN PATENT DOCUMENTS

| | | |
|---|---|---|
| EP | 3 146 860 A1 * | 3/2015 |
| JP | 7-119036 | 5/1995 |
| JP | 11-152690 | 6/1999 |
| JP | 2001-172864 | 6/2001 |
| JP | 2001-172884 | 6/2001 |
| JP | 2009-57652 | 3/2009 |
| JP | 2013-139106 | 7/2013 |
| JP | 2014-185413 | 10/2014 |
| TW | 201247811 | 12/2012 |
| TW | 201337055 | 9/2013 |
| WO | WO-2008-004810 A1 * | 1/2008 |
| WO | WO-2015 064079 A1 * | 5/2015 |

OTHER PUBLICATIONS

Extended European Search Report dated May 21, 2019 in corresponding European Patent Application 16846332.1.
International Search Report (ISR) dated Nov. 29, 2016 in International (PCT) Application No. PCT/JP2016/076252.
Office Action with Search Report dated Nov. 4, 2019 in corresponding Taiwanese patent Application No. 105129785.

* cited by examiner

*Primary Examiner* — Mohammad M Ameen
(74) *Attorney, Agent, or Firm* — Wenderoth, Lind & Ponack, L.L.P.

(57) ABSTRACT

The present invention provides a colored fiber fabric and the like that can be colored in various colors including bright colors and have excellent color fastness to light. The colored fiber fabric includes: a fiber fabric; a white pigment adhering to at least one surface of the fiber fabric via a binder resin; and a resin layer that contains a color pigment and is provided on the white pigment.

14 Claims, No Drawings

COLORED FIBER FABRIC AND METHOD FOR PRODUCING COLORED FIBER FABRIC

TECHNICAL FIELD

The present invention relates to a colored fiber fabric that has excellent color fastness to light (light fastness), and a method for producing such a colored fiber fabric.

BACKGROUND ART

It is known that a fiber fabric that has been colored undergoes a phenomenon such as discoloration or color loss when the colored fiber fabric is exposed to light. Also, such discoloration or color loss appears very differently depending on the material and color of the fiber fabric. With respect to color, a fiber fabric that has been colored in a bright color that has a high luminance such as a fluorescent color has particularly poor color fastness to light.

For this reason, various measures are taken to improve the color fastness to light of a colored fiber fabric.

For example, a fiber fabric made using a polyester fiber has excellent color fastness to light. Accordingly, a technique is known in which a woven fabric with a combination weave with cotton is produced, and a polyester fiber is provided on the surface side of the woven fabric (Patent Literature (PTL) 1).

On the other hand, a fiber fabric made using a nylon fiber, in particular, a fiber fabric made using a very fine nylon fiber has poor color fastness to light. To address this, a technique is known that improves color fastness to light by dyeing the fabric with a reactive dye (PTL 2).

Also, as a measure for a polyester that is dyeable with a cation dye, a technique is known that improves color fastness to light by using an organic nickel complex and an ultraviolet absorbing agent such as benzotriazole (PTL 3).

Also, a fiber fabric made using an aromatic polyamide fiber has much poorer color fastness to light than the fiber fabrics made using the above-described fibers. Accordingly, techniques are known such as adding a tertiary and/or quaternary amine-containing organic compound, and dying with an organic dye in the presence of an alkali metal salt and/or an alkaline earth metal salt (PTL 4, and PTL 5).

Furthermore, for the fiber fabric made using an aromatic polyamide fiber, a technique is known in which the fabric is colored by printing a blend of a pigment and an ultraviolet blocking agent such as titanium oxide (PTL 6).

CITATION LIST

Patent Literature

[PTL 1]
Japanese Unexamined Patent Application Publication No. 2014-185413
[PTL 2]
Japanese Unexamined Patent Application Publication No. H11-152690
[PTL 3]
Japanese Unexamined Patent Application Publication No. H7-119036
[PTL 4]
Japanese Unexamined Patent Application Publication No. 2001-172864
[PTL 5]
Japanese Unexamined Patent Application Publication No. 2001-172884
[PTL 6]
Japanese Unexamined Patent Application Publication No. 2009-57652

SUMMARY OF INVENTION

Technical Problem

With various methods as described above, attempts have been made to improve color fastness to light, but a method that can improve color fastness to light for various types of fibers has not yet been found. It has been found that the use of a blend of a pigment and an ultraviolet blocking agent such as highly transparent titanium oxide does not provide a sufficient effect. Furthermore, the use of a blend of a pigment and less transparent titanium oxide results in a whitish color with a low chromaticness, and thus the number of available colors is significantly limited.

The present invention has been made in view of the problems described above, and provides a colored fiber fabric that can be colored in various colors including bright colors and has excellent color fastness to light not only when the colored fiber fabric is made using a polyester fiber that has high color fastness to light, but also when the colored fiber fabric is made using a fiber that is known to have poor color fastness to light such as an aromatic polyimide fiber, and a method for producing such a colored fiber fabric.

Solution to Problem

The present inventors conducted in-depth studies to solve the above-described problems, and the present invention was accomplished. The present invention relates to, for example, the following (1) to (7).

(1) A colored fiber fabric according to the present invention includes: a fiber fabric; a white pigment adhering to at least one surface of the fiber fabric via a binder resin; and a resin layer that contains a color pigment and is provided on the white pigment.

(2) In the colored fiber fabric described above, the white pigment may contain at least one selected from zinc oxide, titanium oxide, zinc sulfide, barium sulfate, barium carbonate, calcium carbonate, calcium sulfate, white lead, basic lead sulfate, lead sulfate, asbetine, clay, silica, white carbon, diatomaceous earth, talc, magnesium carbonate, alumina white, gloss white, satin white, and antimony oxide.

(3) In the colored fiber fabric described above, the color pigment may contain a fluorescent pigment.

(4) In the colored fiber fabric described above, the fiber fabric may contain an aromatic polyamide fiber.

(5) In the colored fiber fabric described above, the colored fiber fabric may have a light fastness rating of Grade 4 or higher and/or satisfy requirements specified in 5.2 Colour after Xenon Test according to ISO 20471: 2013, the light fastness rating being measured by exposure method 3 specified in Test methods for colour fastness to enclosed carbon arc lamp light (JIS L0842: 2004 7.2 c).

(6) Clothing according to the present invention is made using, at least in part, the colored fiber fabric described above.

(7) A method for producing a colored fiber fabric according to the present invention includes: applying a white pigment and a binder resin onto at least one surface of a fiber fabric; and applying a resin containing a color pigment onto the surface of the fiber fabric on which the white pigment and the binder resin have been applied.

Advantageous Effects of Invention

According to the colored fiber fabric and the method for producing a colored fiber fabric of the present invention, a white pigment is attached to the fiber fabric via a binder resin, and a resin layer that contains a color pigment is formed on the white pigment. With this configuration, it is possible to provide a fiber fabric colored in various colors that has excellent color fastness to light as compared with fiber fabrics made using various fibers.

Accordingly, it is possible to use a brightly colored fiber fabric as a material for outerwear and sportswear. Also, it is possible to use a fiber fabric that has excellent visibility as a material for workwear, in particular, high safety workwear.

DESCRIPTION OF EMBODIMENTS

Hereinafter, preferred embodiments will be described. However, the present invention is not limited these embodiments, and various modifications can be made within the spirit and workable scope of the present invention.

A colored fiber fabric according to the present embodiment is colored by applying a white pigment onto at least one surface of a fiber fabric via a binder resin, and providing a resin layer that contains a color pigment on the white pigment.

The colored fiber fabric may be fully colored or partially colored. As used herein, the expression "partially colored" may refer to coloring applied to the entire surface of only one side of the fiber fabric, or coloring applied to one or both sides of the fiber fabric in a pattern such as a polka dot pattern, a grid pattern, a stripe pattern, a geometric pattern, a botanical pattern, or characters. The size of the pattern can be selected freely according to the design and application. For the purpose of imparting visibility, the colored area preferably includes a pattern that has a diameter or width of 5 cm or more, but this should not be construed as limiting.

Examples of useful fiber fabric materials that can be used for the colored fiber fabric according to the present embodiment include: chemical fibers such as polyester fibers, nylon fibers, acrylic fibers, polyurethane fibers, rayon fibers such as acetate fibers and viscose fibers, polylactic acid fibers, aromatic polyamide fibers (hereinafter, "aromatic polyamide fibers" may also be referred to as "aramid fibers"), polyimide fibers, polyphenylene sulfide fibers, fluorine fibers; natural fibers such as cotton fibers, hemp fibers, silk fibers and wool fibers; and combined filaments, mixed yarns, mixed weaves and mixed knits of the above-listed materials. However, this should not be construed as limiting. Also, the fiber fabric made of any of the above-listed materials may be in any form such as a woven fabric, a knitted fabric, or a non-woven fabric.

The fiber fabric made of any of the above-listed materials may be colored in advance, or may not be colored in advance. In the case where the fiber fabric is colored in advance, coloring can be performed by using, for example, a disperse dye, a cation dye, an acid dye, a direct dye, a reactive dye, a vat dye, a sulfur dye, a fluorescent brightening agent, a pigment, or the like. However, this should not be construed as limiting, and an appropriate dye can be selected according to the material of the fiber fabric. Also, the fiber fabric may be colored in advance by using a fluorescent dye and/or a fluorescent pigment.

Also, in the case where the fiber fabric is colored in advance, dyeing may be performed, using a dye, on the yarn before it is formed into a fiber fabric, or the fiber fabric. Alternatively, at the time of spinning a fiber, the fiber may be colored by using a resin for spinning mixed with a pigment. From the viewpoint of versatility and shortening the lead time, it is desirable that dyeing is performed, using a dye, on the yarn before it is formed into a fiber fabric, or the fiber fabric. In particular, it is desirable that dyeing is performed on the fiber fabric.

Also, with respect to the material of the fiber fabric, like a cation dyeable polyester, a flame-retardant polyester, flame-retardant cotton, polytrimethylene terephthalate, or the like, at the time of spinning a fiber, a chemical agent such as a dulling agent or a flame retardant may be mixed with a resin for spinning, or a chemically-modified resin may be used as the resin for spinning, or after the material has been formed into a fiber or a fiber fabric, an anionization agent, a flame retardant or the like may be added to the fiber or the fiber fabric, or other treatment may be performed so as to impart dyeability with a cation dye, flame retardancy, antistaticity, water repellency, antimicrobial deodorant property, bacteriostasis property, ultraviolet blocking property, and the like.

Also, water resistance or designability may be imparted to the fiber fabric by applying, to the fiber fabric, a urethane resin film, a polytetrafluoroethylene film, a polyester resin film, an acrylic resin film, or the like.

In the case where the colored fiber fabric according to the present embodiment is used for a fiber product such as workwear for use in a hazardous environment such as on the road, in a gas station, an industrial complex, an oil field, or the like, it is preferable to use a flame retardant material as the material of the fiber fabric. Examples of the flame retardant material of the fiber fabric include flame retardant cotton and an aramid fiber. In particular, it is preferable to use a material that contains an aramid fiber. Aramid fibers are known to include: para-aramid fibers such as Kevlar® (available from Du Pont), and Technora® (available from Teijin, Ltd.); and meta-aramid fibers such as Nomex® (available from Du Pont), and Conex® (available from Teijin, Ltd.). However, in the present embodiment, the aramid fiber is not limited to a meta-aramid fiber or a para-aramid fiber. Also, most of these aramid fibers are colored in yellow or orange, but the aramid fiber may be colored or may not be colored.

Aramid fibers undergo particularly significant discoloration and color loss due to exposure to light as compared with other fibers, and thus are difficult to color. However, according to the present embodiment, even if an aramid fiber is contained, it is possible to provide a colored fiber fabric according to the present embodiment that can be colored in various colors including colors that exhibit fluorescence and has excellent color fastness to light. Accordingly, according to the present embodiment, even if a fiber fabric made using a composite fiber composed of an aramid fiber and a fiber other than aramid fibers is used, or a fiber fabric made using a fiber other than aramid fibers that has low color fastness to light is used, or a fiber fabric made using a fiber that is difficult to color in various colors is used, the fiber fabric has high color fastness to light and can be colored in various colors.

In the colored fiber fabric according to the present embodiment, a white pigment adheres to at least one surface of the fiber fabric via a binder resin.

The white pigment is preferably white, and from the viewpoint of increasing the brightness and luminance of the color of the resulting colored fiber fabric, the white pigment preferably reflects a large amount of visible light rays, and more preferably also reflects ultraviolet rays. As a result of the white pigment adhering to the fiber fabric, in addition to improving brightness and luminance, it is also possible to significantly improve light resistance of the resulting colored fiber fabric. Although the reason is not clearly known, it may be explained as follows. In a color pigment exposed to a large amount of reflected light due to reflection of visible light rays and ultraviolet rays, discoloration and color loss proceed rapidly by an amount corresponding to increased energy, and thus the color fastness to light is expected to be low. However, with the use of a white pigment as an undercoating of the color pigment, ultraviolet rays and visible light rays are reflected, as a result of which, the color reproduction of the color pigment is increased while causing little discoloration and color loss, exposure of the fiber fabric to visible light rays and ultraviolet is suppressed, and discoloration and color loss of the fiber that constitutes the fiber fabric are suppressed. Thus, the color fastness to light of the colored fiber fabric according to the present embodiment is improved.

The white pigment preferably contains, specifically, at least one selected from zinc oxide, titanium oxide, zinc sulfide, barium sulfate, barium carbonate, calcium carbonate, calcium sulfate, white lead, basic lead sulfate, lead sulfate, asbetine, clay, silica, white carbon, diatomaceous earth, talc, magnesium carbonate, alumina white, gloss white, satin white, and antimony oxide. It is also possible to use a white pigment that exhibits fluorescence. In the case where a white pigment that exhibits fluorescence is used, from the viewpoint of luminance and light resistance, it is preferable to use a white pigment that exhibits fluorescence in combination with a white pigment that does not exhibit fluorescence.

In particular, as the white pigment, it is preferable to use a white pigment that has low transparency, is unlikely to be transparent even when it is brought into contact with water or oil, reflects visible light rays and ultraviolet rays having a wavelength of 280 nm to 400 nm, and does not deteriorate or decompose the binder resin and the fiber. In particular, from the viewpoint of improving the brightness, the luminance and the light resistance of the color of the resulting fiber fabric, it is preferable to use titanium oxide or zinc oxide as the white pigment. As the titanium oxide, it is preferable to use, rather than a titanium oxide that is transparent and functions as an ultraviolet absorbing agent that absorbs ultraviolet rays, a titanium oxide that is used as a white pigment because it is white, has low transparency and excellent obscuration property, and reflects visible light rays and ultraviolet rays. Also, it is preferable to use a rutile white pigment that exhibits little photocatalytic activity and/or a white pigment that has undergone a surface treatment for suppressing the activity.

Also, the white pigment preferably has an average particle size of 10 nm or more in order to have obscuration property and excellent whiteness so as to reflect a large amount of visible light rays. The white pigment more preferably has an average particle size of 30 nm or more, even more preferably 50 nm or more, and even much more preferably 100 nm or more. The upper limit of the average particle size of the white pigment is preferably 5 µm or less, and more preferably 1 µm or less from the viewpoint of the texture, wear durability and the like of the resulting colored fiber fabric.

In particular, in the case where anatase titanium oxide is used, the catalytic activity increases as the particle size decreases, which may promote deterioration and discoloration of the binder resin and the fiber. For this reason, the average particle size is preferably above 50 nm, more preferably above 100 nm, and even more preferably 200 nm. Also, it is also preferable to use a white pigment that has undergone a surface treatment for suppressing the activity.

The average particle size of the white pigment refers to an average value obtained by, for example, observing a cross section of a colored fiber fabric with a magnification of 2500 times to 10000 times using an electron microscope, measuring the major axis of each of randomly selected 30 white pigment particles, and averaging the measured major axis lengths of the 30 particles. If white pigment particles form an aggregate, the particle size may be measured by selecting one from among the particles constituting the aggregate.

As the binder resin, any resin can be used such as urethane resin, acrylic resin, silicone resin, polyester resin, or nylon resin.

It is also possible to use, together with the binder resin that causes the white pigment to adhere to the fiber fabric, a pigment other than white pigments, an ultraviolet absorbing agent, an antioxidant such as hindered amine, a cross-linking agent, a catalyst, a deodorizing agent, an antimicrobial agent, a flame retardant, an infrared absorbing agent, and the like within the scope that does not deviate from the intended object of the present invention. The pigment other than white pigments may be a color pigment that exhibits fluorescence, or a color pigment that does not exhibit fluorescence.

In the colored fiber fabric according to the present embodiment, the white pigment adheres to at least one surface of the fiber fabric via the binder resin. The total amount of the white pigment and the binder resin adhering to the fiber fabric is preferably 1 g/m$^2$ to 100 g/m$^2$, and more preferably 5 g/m$^2$ to 50 g/m$^2$ from the viewpoint of the brightness and luminance of the color of the resulting colored fiber fabric and the texture of the resulting colored fiber fabric.

The white pigment may be caused to adhere to the fiber fabric by applying a binder resin that contains the white pigment so as to cover the entire surface of both sides of the fiber fabric, or may be caused to adhere to the fiber fabric by applying a binder resin containing the white pigment so as to cover the entire surface of one side of the fiber fabric.

The binder resin containing the white pigment may be impregnated into the fiber fabric. However, in this case, from the viewpoint of the texture of the resulting colored fiber fabric, it is preferable that the amount of the binder resin containing the white pigment impregnated into the fiber fabric is small.

Also, the white pigment and the binder resin may, in the form of a thin film, adhere to the surface of the fiber constituting at least a surface of the fiber fabric, or may partially adhere to the surface of the fiber constituting the surface of the fiber fabric such that a portion of the surface of the fiber constituting the surface of the fiber fabric is exposed. That is, the binder resin containing the white pigment is not necessarily formed in the form of a layer over the entire surface of the fiber fabric, and may be formed in the form of a coating on the surface of an individual fiber constituting the fiber fabric. In this case, the white pigment may adhere, via the binder resin, to the surface of a fiber that constitutes the surface of at least one side of the fiber fabric or the surface of a yarn that constitutes the fiber, with gaps between fibers or yarns, so that the colored fiber fabric has air permeability. The white pigment may adhere not only to the surface of the fiber fabric, but also to the surface of the fiber within the fiber fabric via the binder resin. From the viewpoint of improving the luminance of the color provided through coloring, it is preferable that the white pigment also adheres to the internal fiber in the vicinity of the surface of the fiber fabric.

The white pigment may be applied to the fiber fabric via the binder resin in a pattern such as a polka dot pattern, a grid pattern, a stripe pattern, a geometric pattern, a botanical pattern, or characters according to coloring with a subsequently applied resin layer that contains a color pigment, or the degree to which the light resistance or luminance of the colored area is improved.

In the case where a coating in the form of a layer that has a thickness is formed by the white pigment and the binder resin so as to cover the entire surface of both sides or one side of the fiber fabric, from the viewpoint of the texture of the resulting colored fiber fabric, the coating of a portion that is present on the surface of the fiber fabric (excluding the portion impregnated into the fiber fabric) preferably has a thickness of 50 μm or less, more preferably 20 μm or less, and even more preferably 10 μm or less. If the coating in the form of a layer formed by the white pigment and the binder resin is too thick, the texture may become too hard. The coating may be porous or non-porous. From the viewpoint of air permeability, the coating is preferably porous.

The colored fiber fabric according to the present embodiment includes a resin layer containing a color pigment (color resin layer) that is formed on the white pigment. Thus, the colored fiber fabric is colored by forming a resin layer containing a color pigment on the white pigment.

The color pigment may be an inorganic pigment or an organic pigment. Also, the color pigment may be a blend of an inorganic pigment and an organic pigment, but this should not be construed as limiting. These pigments may be blended according to the color required.

Also, in the present embodiment, the color pigment may contain a fluorescent pigment. That is, the resin layer containing a color pigment that is formed on the white pigment may be a resin layer containing a color pigment that exhibits fluorescence (also referred to as "color fluorescent pigment"). In general, a color fluorescent pigment has poorer light resistance than a pigment that does not exhibit fluorescence, but the colored fiber fabric according to the present embodiment can maintain luminance and have excellent color fastness to light even when it contains a color fluorescent pigment.

Also, as the color fluorescent pigment that can be used as the color pigment in the present embodiment, any color fluorescent pigment can be used according to the intended color and luminance. Examples include a yellow fluorescent pigment, an orange fluorescent pigment, a red fluorescent pigment, a pink fluorescent pigment, and a blue fluorescent pigment. However, this should not be construed as limiting. Also, as the pigment that is contained in the resin layer that is formed on the white pigment, any of the color fluorescent pigments listed above and a white fluorescent pigment may be used in combination.

From the viewpoint of improving the light resistance, a color pigment that exhibits fluorescence and a color pigment that does not exhibit fluorescence may be used in combination. Also, from the viewpoint of improving the luminance and the light resistance, a white fluorescent pigment may be further used in combination.

As the resin that can be used in the resin layer containing a color pigment, any resin can be used such as urethane resin, acrylic resin, silicone resin, polyester resin, or nylon resin.

From the viewpoint of wash durability and wear durability of the resulting colored fiber fabric, the resin that can be used in the resin layer containing a color pigment is preferably the same type of resin as the binder resin used to fixedly attach the white pigment to the fiber fabric.

Also, the resin layer may contain, together with the color pigment, an ultraviolet absorbing agent, an antioxidant such as hindered amine, a cross-linking agent, a catalyst, a deodorizing agent, an antimicrobial agent, a flame retardant, an infrared absorbing agent, and the like within the scope that does not deviate from the intended object of the present invention.

In the case where an ultraviolet absorbing agent is used, as the ultraviolet absorbing agent, a known ultraviolet absorbing agent can be used such as a benzotriazole-based compound, a benzophenone-based compound, or a triazine-based compound. However, it is particularly preferable to use a benzotriazole-based copolymer.

In particular, among benzotriazole-based compounds, the use of a benzotriazole-based copolymer as the ultraviolet absorbing agent prevents the ultraviolet absorbing agent from sublimation even when it is subjected to, for example, high temperature heating after the ultraviolet absorbing agent has been applied to the fiber fabric in the process of producing a colored fiber fabric. Accordingly, a colored fiber fabric that has further excellent color fastness to light can be obtained. Also, fluorescence may be lost if a pigment that exhibits fluorescence and an ultraviolet absorbing agent are used in combination, but by using a benzotriazole-based copolymer as the ultraviolet absorbing agent, it is also possible to suppress the reduction of fluorescence. Accordingly, the limitation on the number of colors that can be used to produce a colored fiber fabric can be reduced. That is, various colors can be selected to color the fiber fabric, and it is possible to produce a colored fiber fabric in various colors.

Examples of the benzotriazole-based copolymer include ULS-1700 available from Lion Specialty Chemicals, Co., Ltd., UVA-1700 available from BASF Japan, NEWCOAT UVA-101, NEWCOAT UVA-102, NEWCOAT UVA-103, NEWCOAT UVA-104, VANARESIN UVA-5080, VANARESIN UVA-5080 (OHV20), VANARESIN UVA-55T, VANARESIN UVA-55MHB, VANARESIN UVA-7075, VANARESIN UVA-7050 (OHV20), and VANARESIN UVA-73T that are available from Shin Nakamura Chemical, Co., Ltd., and those disclosed in Japanese Unexamined Patent Application Publications Nos. 2012-25811, H7-276831, H8-039946, 2006-21402, and H9-003133.

Furthermore, in the case where a flame retardant is used from the viewpoint of flame retardancy, as the flame retardant, it is possible to use antimony trioxide, hexabromo cyclododecan, a halogen flame retardant such as tris(2,3-dibromopropyl) isocyanurate, or a phosphorus-based flame retardant such as a phosphorus ester amide such as biphenyl diphenyl phosphate, diphenyl(phenylamide))phosphate, or a naphthyl diphenyl phosphate.

In the present embodiment, the resin layer containing a color pigment, which is formed on the white pigment, preferably has a thickness of 0.1 μm or more and 50 μm or less.

If the thickness of the resin layer containing a color pigment is less than 1 μm, the chromaticness is lowered, as a result of which the fiber fabric may not be colored in an intended color, or the fiber fabric may not have sufficient wear durability and wash durability. If, on the other hand, the resin layer containing a color pigment has a thickness above 50 μm, the level of improvement of the luminance or the light resistance may be lowered, and the texture may become hard. Also, the resin layer containing a color pigment preferably has a thickness of 0.5 µm or more and 30 µm or less, and more preferably 1 µm or more and 10 µm or less.

Also, in the case where a coating in the form of a layer is formed by the white pigment and the binder resin (a resin layer containing a white pigment) as an undercoating layer for the resin layer containing a color pigment, from the viewpoint of obtaining high color fastness to light, the resin layer containing a color pigment is preferably thicker than the resin layer containing a white pigment.

Note that the thickness of the resin layer includes that of the color pigment. If the resin that constitutes the resin layer is impregnated in gaps between fibers or yarns that constitute the fiber fabric, if the amount of the resin is smaller as compared with the proportion of the color pigment, or if the color pigment has a large particle size, a portion in which the color pigment is present may become thicker than a portion that is composed only of the resin, and the particle size of the color pigment contained in the resin layer may serve as thickness. Also, protrusions formed by the white pigment adhering to the fiber fabric via the binder resin may protrude from the resin layer containing a color pigment. It is not preferable to have protrusions of the white pigment protruding from the resin layer containing a color pigment, but the fiber fabric may partially have such protrusions as long as the intended object of the present invention can be achieved.

Also, the amount of the resin constituting the resin layer containing a color pigment adhering to the fiber fabric is preferably 1 g/m² to 100 g/m² in total, and more preferably 3 g/m² to 50 g/m² from the viewpoint of the brightness and the luminance of the color of the resulting colored fiber fabric and the texture of the resulting colored fiber fabric.

Also, the resin layer containing a color pigment is preferably a non-porous resin film, but the resin layer (resin film) may have pores with a diameter of 1 mm or less within the scope that does not deviate from the intended object of the present invention. Also, as long as the intended color can be obtained, the resin layer containing a color pigment may be in the form of a grid, or may be in the form of a dot instead of a continuous coating.

In the case where the resin layer containing a color pigment is porous, or is in the form of a dot or in the form of a grid, a colored fiber fabric that is air permeable and can suppress moisture, or a colored fiber fabric that has a soft texture is likely to be obtained.

Also, as the fiber fabric, a coarse fabric such as a mesh, a gauze, or a silk gauze may be used within the scope that does not deviate from the intended object of the present invention. In this case, the white pigment and the resin layer containing a color pigment are not necessarily present in voids of the fiber fabric.

The coloring using the resin layer containing a color pigment may be performed on the entire surface of both sides of the fiber fabric, or the entire surface of one side of the fiber fabric.

Also, the coloring may be performed in any pattern such as a polka dot pattern, a grid pattern, a stripe pattern, a geometric pattern, a botanical pattern, or characters, but this should not be construed as limiting. In the case where the resin layer containing a color pigment is formed in a portion of the fiber fabric for use in an application that requires visibility, the pattern is preferably a large pattern with a line width or dot diameter of 50 mm or more.

Also, the resin layer containing a color pigment is laminated on the white pigment. The white pigment is preferably present between the fiber fabric and the resin layer containing a color pigment in all colored areas that have been colored by applying the resin layer containing a color pigment for the purpose of high color fastness to light and a high luminance. In the case where the white pigment partially adheres to the fiber fabric in a pattern such as a dot pattern, a polka dot pattern, a grid pattern, or a stripe pattern, the white pigment preferably accounts for 50% or more of the area between the resin layer containing a color pigment and the fiber fabric, more preferably 80% or more, and even more preferably 90% or more.

In a preferred embodiment, the colored fiber fabric according to the present embodiment has a light fastness rating of Grade 4 or higher and/or satisfies requirements specified in 5.2 Colour after Xenon Test according to ISO 20471: 2013, the light fastness rating being measured by exposure method 3 specified in Test methods for colour fastness to enclosed carbon arc lamp light (JIS L0842: 2004 7.2 c).

More preferably, the colored fiber fabric according to the present embodiment has a light fastness rating measured by exposure method 3 specified in Test methods for colour fastness to enclosed carbon arc lamp light (JIS L0842: 2004 7.2 c) of Grade 5 or higher.

Also, even if the colored fiber fabric according to the present embodiment is made using an aramid fiber that is particularly difficult to color in a bright color and has a poor light fastness rating, the colored fiber fabric according to the present embodiment can be colored in colors that satisfy the luminance factors and the range of the color chromaticity coordinates of fluorescent yellow, fluorescent orange red, and fluorescent red specified in 5.1 Colour Performance Requirements of New Material according to ISO 20471: 2013, and can also satisfy the criteria for the requirements specified in 5.2 Colour after Xenon Test according to ISO 20471: 2013.

As described above, according to the present embodiment, various fibers can be colored in various colors, and a colored fiber fabric that has excellent color fastness to light can be obtained. Accordingly, by using the colored fiber fabric according to the present embodiment, even when it is colored in a fluorescent color, it is possible to provide highly visible clothing with excellent color fastness to light that can be used not only for outerwear, uniform wear for events, sportswear, but also for workwear for oil fields, as well as workwear for hazardous duty work such as firefighting, and road construction. As used herein, the term "clothing" encompasses, in addition to a jacket, an overcoat, pants, a shirt, a vest, workwear, and the like, gloves, shoes, headwear, a race bib, a sash, and the like.

Applications of the colored fiber fabric according to the present embodiment are not limited to clothing, and the colored fiber fabric according to the present embodiment is also applicable to a tent, a sleeping bag, a bag, a flag, and the like.

[Method for Producing Colored Fiber Fabric]

Next, a method for producing a colored fiber fabric according to the present embodiment will be described. It is to be noted that the colored fiber fabric according to the present embodiment is not limited to a colored fiber fabric produced by the following production method. Also, a description of constituent elements that have been already described may be omitted.

The method for producing a colored fiber fabric according to the present embodiment includes: a step of applying a white pigment and a binder resin onto at least one surface of a fiber fabric (first step); and a step of applying a resin containing a color pigment onto the surface of the fiber fabric to which the white pigment and the binder resin have been applied (second step).

In the production method according to the present embodiment, the fiber fabric may be made of any type of fiber including an aramid fiber as described above. Also, the fiber fabric may be subjected to scouring, setting, dyeing, and the like as appropriate.

In the case where a fiber into which a pigment was mixed at the stage of spinning is used, or in the case where dyeing or the like is performed before a white pigment and a binder resin are applied to the fiber fabric, coloring may be performed in any color. However, in the case where the intended color for the colored fiber fabric is a pale color or a bright color that has a high luminance and high chromaticness, coloring may be performed in a color similar to the intended color, or may not be performed to provide a pale color or white color.

Also, the fiber fabric may be subjected in advance to water repellent processing, flame retardant processing, antistatic processing, ultraviolet blocking processing, bacteriostasis processing, antimicrobial/deodorizing processing, or the like. From the viewpoint of exhibiting a soft texture and a high luminance, the fiber fabric is preferably subjected to water repellent processing.

Also, a resin film may be applied to the fiber fabric in advance by coating the fiber fabric with urethane resin, acrylic resin, silicone resin, polyester resin, nylon resin, or the like, or by adhesively attaching an urethane resin film, a polytetrafluoroethylene film, a polyester resin film, an acrylic resin film, a silicone resin film, a nylon resin film, or the like.

In the step of applying a white pigment and a binder resin onto a fiber fabric (first step), for example, a resin solution containing the white pigment and the binder resin may be applied to the fiber fabric.

The resin solution can be applied by a method such as a textile printing method that uses a flat screen, a rotary screen or an inkjet, a spray method that uses an atomizer or the like, a transfer method that uses a gravure coater, a lick roller or the like, a coating method that uses a knife coater, a bar coater or the like.

Also, the white pigment and the binder resin may be applied to the fiber fabric by applying a binder resin solution containing a white pigment onto a release sheet or the like, followed by drying to form a resin film, and directly using the resin film, or using an additional binder resin. Alternatively, the white pigment and the binder resin may be applied to the fiber fabric by applying a binder resin solution containing a white pigment onto a release sheet, and thereafter laminating a fiber fabric on the binder resin solution in an undried or semi-dried state.

From the viewpoint of the degree of freedom of the weave of the resulting colored fiber fabric, as well as color stability and productivity, a resin solution containing a white pigment and a binder resin may be applied to the fiber fabric by using a textile printing method that uses a screen, in particular, preferably a rotary screen.

In the case where the white pigment and the binder resin are applied to the entire surface of both sides of the fiber fabric, from the viewpoint of productivity, it is preferable to apply a resin solution containing the white pigment and the binder resin by using a padding method.

After the resin solution containing the white pigment and the binder resin has been applied to one surface of the fiber fabric, the fiber fabric may be dried at a temperature of 60C° to 130C°, or heated at a temperature of about 130C° to 250C° according to the material of the fiber fabric and the binder resin as appropriate. After that, the fiber fabric may be subjected to soaping or the like as appropriate.

As the resin solution, it is possible to use a solution obtained by diluting, dispersing or dissolving the white pigment and the binder resin by using water, methyl ethyl ketone, toluene, xylene, hexane, methyl acetate, ethyl acetate, ethyl alcohol, isopropyl alcohol, isobutyl alcohol, dimethylacetamide, or a mixture thereof.

The resin solution may further contain, together with the white pigment and the binder resin, a pigment other than white pigments, an ultraviolet absorbing agent, an antioxidant such as hindered amine, a cross-linking agent, a catalyst, a deodorizing agent, an antimicrobial agent, a flame retardant, an infrared absorbing agent, and the like within the scope that does not deviate from the intended object of the present invention. In this case, the pigment other than white pigments may be a color pigment that exhibits fluorescence or a color pigment that does not that exhibit fluorescence, and can be selected according to the intended color, luminance, and light fastness rating.

The white pigment and the binder resin have already been described above.

After the white pigment and the binder resin have been applied to the fiber fabric, a resin containing a color pigment is applied to the surface of the fiber fabric to which the white pigment and the binder resin have been applied (second step).

The resin containing a color pigment can be applied in the same manner as that used to apply the white pigment and the binder resin described above. For example, a resin solution containing a color pigment can be applied by a method such as a textile printing method that uses a flat screen, a rotary screen or an inkjet, a spray method that uses an atomizer or the like, a transfer method that uses a gravure coater, a lick roller or the like, a coating method that uses a knife coater, a bar coater or the like, a padding method, or the like. By using any of these methods, the resin solution containing a color pigment can be applied on the white pigment that has been applied to the surface of the fiber fabric via the binder resin.

Also, the resin solution containing a color pigment may be applied to the fiber fabric by applying the resin solution containing a color pigment onto a release sheet or the like, followed by drying to form a resin film, and directly using the resin film, or using an additional binder resin. Alternatively, the resin containing a color pigment may be applied to the fiber fabric by applying the resin solution containing a color pigment onto a release sheet, and thereafter laminating a fiber fabric on the resin solution in an undried or semi-dried state such that the surface of the fiber fabric to which the white pigment and the binder resin have been applied is in contact the resin solution.

The resin containing a color pigment may also be applied to a portion of the fiber fabric where the white pigment is not applied, or even in a portion of the fiber fabric where the white pigment is applied, there may be a portion where the resin containing a color pigment is not applied.

As the resin solution, it is possible to use a solution obtained by diluting, dispersing or dissolving the color pigment by using water, methyl ethyl ketone, toluene, xylene, hexane, methyl acetate, ethyl acetate, ethyl alcohol, isopropyl alcohol, isobutyl alcohol, dimethylacetamide, or a mixture thereof.

Also, the resin solution may further contain, together with the color pigment and the resin, a white pigment, an ultraviolet absorbing agent, an antioxidant such as hindered amine, a cross-linking agent, a catalyst, a deodorizing agent, an antimicrobial agent, a flame retardant, an infrared absorbing agent, and the like within the scope that does not deviate from the intended object of the present invention.

The color pigment, the resin, the ultraviolet absorbing agent, the flame retardant, and the like have already been described above.

After the resin containing a color pigment has been applied, the fiber fabric may be dried at a temperature of 60C° to 130C°, or heated at a temperature of about 130C° to 250C° according to the material of the fiber fabric and the resin as appropriate. After that, the fiber fabric may be subjected to soaping or the like as appropriate.

From the viewpoint of productivity and color stability, it is preferable to use a textile printing method in the step of applying a white pigment and a binder resin to a fiber fabric, and the step of applying a resin containing a color pigment to the fiber fabric. By using a textile printing method, these steps can be performed continuously without performing a drying or heating treatment between the step of applying a white pigment and a binder resin to a fiber fabric and the step of applying a resin containing a color pigment to the fiber fabric. Among textile printing methods, it is preferable to use a rotary screen from the viewpoint of productivity.

Also, after the fiber fabric has been colored by applying the resin containing a color pigment to the fiber fabric, the fiber fabric may be subjected to flame retardant processing, antistatic processing, antimicrobial/deodorizing processing, bacteriostasis processing, ultraviolet blocking processing, light fastness improvement processing, or water repellent processing by using a padding method.

In the case where a resin film that has water resistance (water resistant resin film) is applied to the fiber fabric, the water resistant resin film may be applied to one surface of the fiber fabric after the resin containing a color pigment has been applied to the fiber fabric. Examples of the resin that can be used in the water resistant resin film include a urethane resin film, a polytetrafluoroethylene film, a polyester resin film, an acrylic resin film, a silicone resin film, and nylon resin. These water resistant resin films may be porous or non-porous.

In the case where the water resistant resin film is applied to the fiber fabric, the following method may be used.

For example, the water resistant resin film may be applied by applying a resin solution for forming a water resistant resin film to one surface of the fiber fabric (the surface on which the resin containing a color pigment is not applied in the case where the resin containing a color pigment is applied on only one surface of the fiber fabric) by using a pipe coater or the like, immersing the fiber fabric to which the resin solution has been applied in water or the like for resin solidification and desolvation, followed by drying.

Alternatively, the water resistant resin film may be applied by applying a resin solution for forming a water resistant resin film to one surface of the fiber fabric (the surface on which the resin containing a color pigment is not applied in the case where the resin containing a color pigment is applied on only one surface of the fiber fabric) by using a pipe coater or the like, followed by drying to form a resin film.

Alternatively, the water resistant resin film may be applied by placing one surface of the fiber fabric (the surface on which the resin containing a color pigment is not applied in the case where the resin containing a color pigment is applied on only one surface of the fiber fabric) directly, or via an adhesive, on the surface of a semi-dried resin solution for forming a water resistant resin film or an already formed water resistant resin film, and adhesively attaching the fiber fabric and the resin film.

The water resistant resin film that is adhesively attached to the fiber fabric may be composed only of a water resistant resin film of polytetrafluoroethylene, polyester resin or the like, or composed of a water resistant resin film formed on release paper such as urethane resin. Alternatively, the water resistant resin film may be a composite resin film obtained by laminating a polyurethane resin film and a polytetrafluoroethylene film.

In the case where the water resistant resin film laminated on release paper or the like is adhesively attached to the fiber fabric, after the water resistant resin film and the fiber fabric have been adhesively attached, an unnecessary component such as the release paper may be removed by peeling off the release paper at an arbitrary stage.

The water resistant resin film may further contain an ultraviolet absorbing agent, an antioxidant, a cross-linking agent, a catalyst, a deodorizing agent, an antimicrobial agent, a flame retardant, a water repellent, a water resistance enhancing agent such as silicon dioxide, a pigment, an infrared absorbing agent, and the like.

In the case where the resin film is adhesively attached to the fiber fabric by using an adhesive, the adhesive may further contain an ultraviolet absorbing agent, an antioxidant, a cross-linking agent, a catalyst, a deodorizing agent, an antimicrobial agent, a flame retardant, a water repellent, an infrared absorbing agent, and the like.

After the water resistant resin film has been applied to the fiber fabric, the fiber fabric may be dried or heat set.

On the surface of the water resistant resin film on which the fiber fabric is not laminated, another fiber fabric such as a woven fabric or a knitted fabric may be adhesively attached by using an adhesive.

Also, the water resistant resin film may also have moisture permeability.

[Clothing Made Using Colored Fiber Fabric]

Clothing according to the present embodiment is made using, at least in part, the colored fiber fabric according to the present embodiment. Because the colored fiber fabric described above can be colored in various colors, and has excellent color fastness to light, by using the colored fiber fabric according to the present embodiment as clothing material, it is possible to provide highly fashionable and highly visible clothing.

Examples of the clothing include a blouse, a shirt, pants, a jumper, a jacket, a down jacket, a vest, a wind jacket, an anorak, an overcoat, a raincoat, ordinary workwear, a windbreaker, skiwear, snowboard wear, other sportswear, gloves, headwear, and shoes. Other examples include workwear for workers who work in hazardous places such as a roadway, a motorway, a harbor, an airport, a railway, a parking lot, an oil field, a gas field, and an industrial complex, a firefighting suit, and a life jacket. However, this should not be construed as limiting.

In the case where the colored fiber fabric is used for a blouse, a jacket, ordinary workwear, or sportswear, it is preferable to use a colored fiber fabric that has a light fastness rating of Grade 4 or higher, the light fastness rating being measured by exposure method 3 specified in Test methods for colour fastness to enclosed carbon arc lamp light (JIS L0842: 2004 7.2 c).

Also, in the case where the colored fiber fabric is used for clothing worn in hazardous places such as workwear used on the road and in an industrial complex, a fire fighting suit, a life jacket, or the like, it is preferable to use a colored fiber fabric that satisfies the requirements specified in 5.2 Colour after Xenon Test according to ISO 20471: 2013.

The colored fiber fabric may be used entirely or partially in the clothing. Particularly when the colored fiber fabric is used partially in clothing for workers who work in hazardous places such as on the road and in an industrial complex, the colored fiber fabric may be used partially in the clothing in a pattern such as a stripe pattern, or may be used entirely in a part of clothing such as sleeves, bodices, or hems. Preferably, the entire outer surface of clothing is formed by using the colored fiber fabric according to the present embodiment.

In the case where the colored fiber fabric according to the present embodiment is used in a stripe pattern, although there is no particular limitation on the stripe width, in the case where the colored fiber fabric is used in a portion of clothing used for hazardous duty work, from the viewpoint of high visibility, the stripe width is preferably 50 mm or more. Furthermore, in this case, it is preferable that the colored fiber fabric extends across the front and back sides of the clothing when worn. For example, the colored fiber fabric is preferably continuous from the front bodice to the back bodice.

As the area of the colored fiber fabric in the clothing used for hazardous duty work, in the outer portion of the clothing, the area of the colored fiber fabric is 0.14 m$^2$ or more, preferably 0.5 m$^2$ or more, and more preferably 0.8 m$^2$ or more. More preferably, the entire clothing may be made using the colored fiber fabric.

Applications of the colored fiber fabric according to the present embodiment are not limited to clothing, and the colored fiber fabric according to the present embodiment is also applicable to a tent, a sleeping bag, a signboard, a flag, and the like.

EXAMPLES

Hereinafter, the colored fiber fabric according to the present embodiment will be further described by way of examples, but the present invention is not limited to the examples given below. In the examples and comparative examples given below, various physical properties shown in evaluation items A to G were measured and evaluated by the following methods.

[A. JIS L0842 Light Fastness Rating: Carbon Arc]

Testing (scale 2 exposure, scale 3 exposure, scale 4 exposure, scale 5 exposure) was performed according to exposure method 3 specified in Test methods for colour fastness to enclosed carbon arc lamp light (JIS L0842: 2004) so as to check light fastness rating. In the case of a colored fiber fabric colored by applying a color pigment on one surface of the fiber fabric, the surface of the colored fiber fabric on which a resin layer containing a color pigment was formed was used as a carbon arc exposure surface.

[B. Determination of Conformance to 5.1 Colour Performance Requirements of New Material According to ISO 20471: 2013]

Based on 5.1 according to ISO 20471: 2013, Y, x, and y in a Yxy color system were measured using a spectrophotometer (CM-2600C available from Konica Minolta, Inc.), and compared with the requirements for fluorescent orange red and evaluated. Also, luminance 13 was obtained by $\beta=Y/100$. In the case of a colored fiber fabric colored by applying a color pigment on one surface of the fiber fabric, the surface of the colored fiber fabric on which a resin layer containing a color pigment was formed was used as a colorimetry surface.

[C. Determination of Conformance to Requirements Specified in 5.2 Colour after Xenon Test According to ISO 20471: 2013]

Based on 5.2 according to ISO 20471: 2013, Y, x, and y in a Yxy color system were measured using a spectrophotometer (CM-2600C available from Konica Minolta, Inc.), and compared with the requirements for fluorescent orange red and evaluated. Also, luminance $\beta$ was obtained by $\beta=Y/100$. In the case of a colored fiber fabric colored by applying a color pigment on one surface of the fiber fabric, the surface of the colored fiber fabric on which a resin layer containing a color pigment was formed was used as a xenon arc exposure surface, and the exposure surface was used as a colorimetry surface.

[D. Measurement of Particle Size]

The average particle size of the white pigment was obtained by observing a cross section of a colored fiber fabric with a magnification of 2500 times to 10000 times using an electron microscope, measuring the major axis of each of randomly selected 30 white pigment particles, and averaging the measured major axis lengths of the 30 particles. In the case where white pigment particles formed an aggregate, the particle size was measured by selecting one from among the particles constituting the aggregate.

[E. Moisture Permeability]

Moisture permeability by a calcium chloride method was measured according to JIS L1099-1993A-1. Also, moisture permeability by a potassium acetate method was measured according to JIS L1099-19938-1.

In both the calcium chloride method and the potassium acetate method, the measured value was converted to a moisture permeability per 24 hours.

[F. Water Pressure Resistance]

Water pressure resistance was measured according to Method B (high water pressure method) of JIS L1092-1998 water resistance test (hydrostatic pressure method).

In the case of a test piece extendable under water pressure, a nylon taffeta (with a total density of warp and weft per 2.54 cm of about 210 threads) was placed on the test piece, which was then attached to a testing machine, and then measurement was performed.

[G. Flame Retardancy]

Flame retardancy was tested according to Method A (surface flame contact) of ISO 15025:2000 and ASTM D6413, and the result was evaluated as "Passed" or "Failed".

Example 1

A twill fabric whose warp and weft threads were both made of Nomex® (meta-aramid fiber, available from Du Pont, No. 40 count, two-ply) was scoured, and used as a fiber fabric. This woven fabric was not colored in advance.

Two rotary screens with 80 meshes per 2.54 cm were attached to a textile printing machine. First, a treatment liquid (resin solution) containing a white pigment and a binder resin was supplied to a screen for printing the treatment liquid onto a fiber fabric, and then, a treatment liquid (resin solution) containing a color pigment and a resin was supplied to a screen for printing the treatment liquid onto the fiber fabric. The treatment liquid containing a white pigment and a binder resin was printed onto the entire surface of one side of the woven fabric, the woven fabric was dried, and then the treatment liquid containing a color pigment and a resin was printed onto the entire surface of the side of the fiber fabric on which the resin solution containing a white pigment and a binder resin had been printed. The amount of white pigment and binder resin applied to the fiber fabric (after drying) was 40 g/m², and the amount of resin including a color pigment applied to the fiber fabric (after drying) was 20 g/m².

[Treatment Liquid Containing White Pigment and Binder Resin]

| | |
|---|---|
| White pigment (titanium oxide, average particle size: 0.4 μm, rutile white pigment) | 20 mass % |
| Acrylic resin | 13 mass % |
| Cross-linking agent (isocyanate-based cross-linking agent) | 1.8 mass % |
| Catalyst | 0.2 mass % |
| Water | 65 mass % |

[Treatment Liquid Containing Color Pigment and Resin]

| | |
|---|---|
| MASTUMIN Glow Color Orange MRS (color pigment, fluorescent orange pigment, available from Matsui Shikiso Chemical Co., Ltd.) | 16 mass % |
| RYUDYE-W Orange RS-E (color pigment, non-fluorescent orange pigment, available from DIC Corporation) | 0.5 mass % |
| NEWCOAT UVA-104 (available from Shin Nakamura Chemical, Co., Ltd., ultraviolet absorbing agent: benzotriazole-based copolymer, solid content: 45.5 mass %) | 30 mass % |
| Acrylic resin | 15 mass % |
| Cross-linking agent (isocyanate-based cross-linking agent) | 2 mass % |
| Thickener | 1.5 mass % |
| Water | 35 mass % |

Next, the fiber fabric on which the two treatment liquids (resin solutions) had been printed was dried at 60C°, and then heated at 150C° for 1 minute.

Next, an aqueous solution containing 5% of fluorine-based water repellent (Asahi Guard AG-E081, available from Asahi Glass Co., Ltd.) was applied using a padding method, which was then dried at 130C° for 30 seconds, and heated at 170C° for 30 seconds. A colored fiber fabric colored in fluorescent orange was thereby obtained.

In the obtained colored fiber fabric, the white pigment adhered to one surface of the fiber fabric via the binder resin, and the resin layer containing a color pigment was formed on the white pigment, whereby the color was imparted.

Comparative Example 1

A colored fiber fabric was obtained in the same manner as in Example 1, except that the treatment liquid (resin solution) containing a white pigment and a binder resin was not applied, and the treatment liquid (resin solution) containing a color pigment and a resin was used by removing the non-fluorescent orange pigment (color pigment) therefrom.

Example 2

The colored fiber fabric obtained in Example 1 was calendered at room temperature under pressure (line pressure) of 128 kg/cm.

Next, in order to apply a water resistant resin film to the colored fiber fabric obtained above, the following adhesive solution was applied spotwise onto a porous polytetrafluoroethylene film (TX2201 available from Nippon Donaldson, Ltd.), and the surface on which the adhesive was applied was placed on the surface of the colored fiber fabric to which the resin solution containing a color pigment and a resin was not applied, which was nipped so as to adhesively attach them, which was then dried at 120C°.

[Adhesive Solution (Adhesive Urethane Resin Solution)]

| | |
|---|---|
| Ether-based urethane resin (solid content: 50%) | 100 parts by mass |
| Flame retardant (aluminum diethylphosphinate) | 50 parts by mass |
| Toluene | 30 parts by mass |
| Methyl ethyl ketone | 10 parts by mass |
| Takenate WD-725 (isocyanate-based cross-linking agent, available from Takeda Pharmaceutical Company, Ltd.) | 9 parts by mass |
| Curing catalyst HI215 (available from Dainichiseika Color and Chemicals Co., Ltd.) | 0.5 parts by mass |

Next, finish setting was performed at 160C° for 1 minute. A colored fiber fabric that was colored in fluorescent orange and had a water resistant resin film laminated thereon was obtained.

The results of measurement and evaluation obtained in the above-described evaluation items A to G of the colored fiber fabrics obtained in Example 1, Comparative Example 1, and Example 2 are shown in Table 1 given below.

TABLE 1

| | Evaluation Item | Example 1 | Comparative Example 1 | Example 2 |
|---|---|---|---|---|
| A | Light fastness rating: carbon | Grade 5 | Less than Grade 2 | Grade 5 |
| B | Requirements for color | Requirements for orange red Satisfied | Requirements for orange red Satisfied | Requirements for orange red Satisfied |
| | β | 0.45 | 0.47 | 0.45 |
| | x | 0.571 | 0.574 | 0.571 |
| | y | 0.368 | 0.366 | 0.368 |
| C | Requirements for color after Xenon test | Requirements for orange red Satisfied | Requirements for orange red Not satisfied | Requirements for orange red Satisfied |
| | β | 0.45 | 0.39 | 0.45 |
| | x | 0.545 | 0.548 | 0.545 |
| | y | 0.374 | 0.372 | 0.374 |

TABLE 1-continued

| | Evaluation Item | Example 1 | Comparative Example 1 | Example 2 |
|---|---|---|---|---|
| D | Particle size | 0.4 μm | 0.4 μm | 0.4 μm |
| E | Moisture permeability A-1 method | — | — | 9690 g/m² · 24 hr |
| | Moisture permeability B-1 method | — | — | 15500 g/m² · 24 hr |
| F | Water pressure resistance | — | — | 196 Kpa or more |
| G | Flame retardancy ISO 15025 | Passed | Passed | Passed |
| | Flame retardancy ASTM D6413 | Passed | Passed | Passed |

From the results shown in Table 1, it can be seen that the colored fiber fabrics of Examples 1 and 2 had excellent light resistance as indicated in evaluation item A despite the fact that the colored fiber fabrics were colored in a fluorescent color and were made using a polyamide fiber. Accordingly, it is possible to provide colored fiber fabrics in various colors by using various materials, and provide highly fashionable clothing.

As can be seen from evaluation item B, the colored fiber fabrics of Examples 1 and 2 both satisfied the criteria for fluorescent orange red specified in 5.1 Colour Performance Requirements of New Material according to ISO 20471: 2013, from which it is clear that even a fiber fabric made using a fiber that is difficult to color such as an aramid fiber can be colored in various colors.

Accordingly, the colored fiber fabric can be used as workwear for workers who work in hazardous places such as on the road, and it is thereby possible to further enhance the safety of workers.

Also, as can be seen from evaluation item C, the colored fiber fabrics of Examples 1 and 2 satisfied the criteria for fluorescent orange red specified in 5.1 Colour Performance Requirements of New Material according to ISO 20471: 2013 even after they were exposed to xenon arc radiation, from which it is clear that even when clothing made using the colored fiber fabrics is used in an environment exposed to sunlight, excellent visibility can be maintained for a long period of time, and it is therefore possible to maintain the safety of workers.

Also, as can be seen from evaluation item E, the colored fiber fabric of Example 2, on which a water resistant resin film was laminated, had excellent moisture permeability. Furthermore, as can be seen from evaluation item F, the colored fiber fabric of Example 2 also had excellent water resistance.

Also, as can be seen from evaluation item G, the colored fiber fabrics of Examples 1 and 2 had excellent flame retardancy.

The invention claimed is:

1. A colored fiber fabric comprising:
   a fiber fabric;
   a white pigment adhering to at least one surface of the fiber fabric via a binder resin, the white pigment and the binder resin forming a white resin layer on the at least one surface of the fiber fabric; and
   a resin layer that contains a color pigment, the resin layer being provided above the white resin layer such that the white resin layer is an undercoating layer,
      wherein the color pigment contains a fluorescent pigment,
   wherein the resin layer that contains the color pigment has a thickness greater than a thickness of the white resin layer,
   wherein the colored fiber fabric has a light fastness rating of Grade 4 or higher and/or satisfies requirements specified in 5.2 Colour after Xenon Test according to ISO 20471: 2013, the light fastness rating being measured by exposure method 3 specified in Test methods for colour fastness to enclosed carbon arc lamp light (JIS L0842: 2004 7.2 c), and wherein the colored fiber fabric is colored in colors that satisfy the luminance factors and the range of the color chromaticity coordinates of fluorescent yellow, fluorescent orange red, and fluorescent red specified in 5.1 Colour Performance Requirements of New Material according to ISO 20471: 2013.

2. The colored fiber fabric according to claim 1, wherein the white pigment contains at least one selected from zinc oxide, titanium oxide, zinc sulfide, barium sulfate, barium carbonate, calcium carbonate, calcium sulfate, white lead, basic lead sulfate, lead sulfate, asbetine, clay, silica, white carbon, diatomaceous earth, talc, magnesium carbonate, alumina white, gloss white, satin white, and antimony oxide.

3. The colored fiber fabric according to claim 1, wherein the fiber fabric contains an aromatic polyamide fiber.

4. Clothing comprising, at least in part, the colored fiber fabric according to claim 1.

5. The colored fiber fabric according to claim 1, wherein the white resin layer is porous.

6. The colored fiber fabric according to claim 1, wherein the white resin layer has a thickness of 50 μm or less.

7. The colored fiber fabric according to claim 1, wherein a total amount of the white pigment and the binder resin adhering to the fiber fabric ranges from 1 g/m² to 100 g/m², inclusive.

8. The colored fiber fabric according to claim 1, wherein the resin layer that contains the color pigment contains a color pigment that exhibits fluorescence and a color pigment that does not exhibit fluorescence.

9. The colored fiber fabric according to claim 1, wherein the resin layer that contains the color pigment contains a white fluorescent pigment.

10. The colored fiber fabric according to claim 1, wherein the resin layer that contains the color pigment contains an ultraviolet absorbing agent.

11. The colored fiber fabric according to claim 1, wherein the resin layer that contains the color pigment has a thickness ranging from 0.1 μm to 50 μm, inclusive.

12. The colored fiber fabric according to claim 1, wherein a total amount of a resin adhering to the fiber fabric ranges from 1 g/m² to 100 g/m², inclusive, the resin being included in the resin layer that contains the color pigment.

13. The colored fiber fabric according to claim 10, wherein the ultraviolet absorbing agent is a benzotriazole-based compound.

14. The colored fiber fabric according to claim 10, wherein the ultraviolet absorbing agent contains a benzotriazole-based copolymer.

\* \* \* \* \*